(12) United States Patent
Crain, Jr. et al.

(10) Patent No.: US 7,157,715 B1
(45) Date of Patent: Jan. 2, 2007

(54) RADIATION DOSIMETER DEVICE

(75) Inventors: William R. Crain, Jr., Manhattan Beach, CA (US); Dan J. Mabry, El Segundo, CA (US); John Bernard Blake, Santa Monica, CA (US); Norman Katz, Palos Verdes Estates, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 11/342,997

(22) Filed: Jan. 30, 2006

(51) Int. Cl.
*G01T 1/02* (2006.01)

(52) U.S. Cl. .............................. 250/370.07; 250/370.09

(58) Field of Classification Search ........... 250/370.07, 250/370.01, 336.1, 370.09
See application file for complete search history.

(56) References Cited

U.S. PATENT DOCUMENTS

| | | | | |
|---|---|---|---|---|
| 5,949,075 A | * | 9/1999 | Kishi | 250/370.07 |
| 6,316,782 B1 | * | 11/2001 | Akselrod et al. | 250/582 |
| 2004/0129888 A1 | * | 7/2004 | Kannan et al. | 250/370.07 |
| 2004/0188677 A1 | * | 9/2004 | Luszik-Bhadra et al. | 257/48 |
| 2004/0200967 A1 | * | 10/2004 | Russell | 250/370.01 |

FOREIGN PATENT DOCUMENTS

DE          2430370 A    *   1/1976

\* cited by examiner

*Primary Examiner*—David Porta
*Assistant Examiner*—Mark R. Gaworecki
(74) *Attorney, Agent, or Firm*—Derrick Michael Reid

(57) ABSTRACT

An improved radiation dosimeter device in an improved radiation dosimeter system provides a DC analog output voltage that is proportional to the total ionizing dose accumulated as a function of time at the location of the dosimeter in a host spacecraft, so as to operate in a system bus voltage range common to spacecraft systems with the output being compatible with conventional spacecraft analog inputs, while the total dose is measured precisely by continually monitoring the energy deposited in a silicon test mass accumulating charge including charge contribution prior to radiation threshold detection for improved measurement of the total accumulated charge with the dosimeters being daisy-chained and distributed about the spacecraft for providing a spacecraft dose profile about the spacecraft using the improved radiation dosimeter system.

11 Claims, 3 Drawing Sheets

RADIATION DOSIMETER

RADIATION DOSIMETER SYSTEM

QUANTIZER LOOP INTEGRATION

LOOK-AHEAD INTEGRATION

RADIATION DOSIMETER DEVICE

REFERENCE TO RELATED APPLICATION

The present application is related to applicant's copending application entitled Radiation Dosimeter System, Ser No. 11/342,998, filed Jan. 30, 2006, by the same inventors.

FIELD OF THE INVENTION

The invention relates to the field of radiation dosimeters. More particularly, the present invention relates to radiation dosimeter devices and systems for measuring radiation exposure on spacecraft.

BACKGROUND OF THE INVENTION

Microelectronics in spacecraft are vulnerable to degradation and even failure from the radiation dose caused by energetic electrons and ions. It is highly desirable to have radiation sensors onboard the spacecraft to serve as continuous monitors of the radiation exposure. Dosimeters can monitor radiation exposure and should be small devices that can be colocated with the critical electronic systems and economical enough in dollars and spacecraft resources to be routinely included as part of most spacecraft subsystems. A radiation dose is the energy absorbed by an object per unit mass, for example, in ergs per gram for most electronic devices, and particularly, in ergs per gram of silicon.

Dosimeters have been flown on several missions for decades. In some cases, a direct measurement was made of the energy deposited in a test mass of silicon. These measurements can be carried out by integrating the charge created in silicon by space radiation over a satellite mission lifetime. Several test masses were used in each dosimeter, each shielded by a different, hemispherical thickness of aluminum or other spacecraft material. The shield thicknesses can be chosen to represent commonplace shielding of spacecraft systems, so that the dose at those locations could be inferred from the measurement. While the measurement of radiation energy was accomplished through directed methods, the dose at the particular location on the spacecraft was obtained indirectly. However these dosimeters weigh several pounds, consume several watts, and must be mounted on the surface of the spacecraft with a clear $2\pi$ view of space. Thus, significant spacecraft resources are disadvantageously required. Additionally, radiation dosimeters require dedicated interfacing to system processors for storing radiation exposure profiles about the spacecraft.

Other flown dosimeter electronic devices follow the degradation of the devices as a function of time and shielding thickness. However, for such a measurement to be useful in a quantitative sense, the sensitivity of a complex electronic component to radiation should be known. Annealing effects, among others, make interpretation difficult. However, the great attraction of such dosimeters is that the dosimeters are very small, require little spacecraft resources, and can be placed inside various spacecraft boxes. The dosimeters could be located directly at the desired spots of necessity on a craft, but made an indirect measurement of a radiation dose. Conventional dosimeters basically are of two types, which may be referred to as Type 1 and Type 2.

The Type 1 dosimeter consists of a box that is mounted on the spacecraft at a single location, with an unimpeded view of the external radiation environment. This sensor uses one or more silicon detectors under selected shield thicknesses representative of typical incidental spacecraft shielding. Thus, a Type 1 dosimeter gives the depth-dose profile of the radiation environment of the host spacecraft in an ideal geometry. The total dose and dose rate data acquired thereby is used with radiation transport codes to determine the radiation dose at points of interest throughout the host spacecraft.

There are several problems associated with the Type 1 dosimeter. First, the dosimeter must be fine-tuned for each host vehicle, and knowledge of the detailed spacecraft design is necessary to complete the dosimeter development. This approach requires significant ray-tracing analysis of the host vehicle design to determine an equivalent thickness of slab-shield or hemispherical-shield geometry to be placed over the detector. This detailed process is prone to error from tolerance build-up in the analysis and from inherent errors in transforming what are typically very complex spacecraft geometries into a simple single thickness of metal. Furthermore, even minor changes in the vehicle design can cause a significant error unless a new ray-tracing analysis is performed. The second problem with the Type 1 dosimeter is the necessary mounting on the spacecraft that requires that each sensor have a clear field-of-view. This is necessary to be able to control the amount of known shielding over the sensors. This constraint puts the dosimeter payload in competition for precious real estate on the spacecraft or requires that the dosimeter settle for some non-ideal spacecraft obstruction to the field-of-view. Finally, radiation transfer calculations are complex and require highly accurate models of the spacecraft of interest in order to obtain accurate results. These calculations are far from trivial or cheap to carry out.

The Type 2 dosimeters make indirect measurements of accumulated dose by measuring the response of an electronic device to ionizing radiation. An example of a Type 2 dosimeter uses a PMOS transistor as the detector element and the associated electronics measure the change in the threshold voltage required to maintain the device at a specified operating point. This Type 2 dosimeter measures the effect of radiation on the gate oxide rather than the silicon, but using the results to infer a silicon dose. This inference is accomplished by comparing flight devices against an extrapolation of prelaunch irradiation measurements to estimate the total dose absorbed by the device. Another dosimeter in this Type 2 class is an EPROM dosimeter where a relationship between memory bit-errors and total dose is used to estimate the dose as in U.S. Pat. No. 5,596,199, issued to McNulty. The main problem with this degradation dosimeter technique is that it is indirect, in that, the devices do not measure radiation dose but the radiation effects upon a specific device. Not all devices degrade in the same way or at the same rate and the understanding of rate and annealing effects become critical. These indirect radiation effects make the interpretation of the device output prone to serious error. A pre-irradiation test of these Type 2 devices is usually performed to establish an operational curve that represents the degradation as a function of the dose received. However, one cannot expose devices to the full range of dose when those same devices are to be positioned in orbit. So, flight devices are typically irradiated at unrealistically low doses on the ground with an extrapolation to predict higher doses actually occurring in orbit.

The most desirable dosimeter is one that makes a direct measurement of the radiation dose and is located directly at the spot of interest. Typically, a radiation dose signal originating in a detector is preamplified and compared to a radiation energy threshold limit, the exceeding of which indicates the reception of a radiation quanta dose in the form of a charge deposit that is then accumulated by integration. Upon reaching this radiation energy threshold limit, integration of the radiation dose signal is a direct measurement of the absorbed radiation energy. A problem with this threshold triggering is that prethreshold charge is not accumulated and represents an error in measurement either by failing to capture the prethreshold charge or by an approximation of the prethreshold triggering energy that is subject to inaccuracies. These and other disadvantages are solved or reduced using the invention.

SUMMARY OF THE INVENTION

An object of the invention is to provide a radiation dosimeter device for the detection of radiation.

Another object of the invention is to provide a radiation dosimeter device for the detection of accumulated radiation from charge deposits above a threshold.

Another object of the invention is to provide a radiation dosimeter device for the detection of accumulated radiation from charge deposits above a threshold and including prethreshold radiation detection charge accumulations for improved measurement of radiation exposure.

Yet another object of the invention is to provide a radiation dosimeter device for the detection of accumulated radiation from charge deposits above a threshold and including prethreshold radiation detection charge accumulations for improved measurement of radiation exposure and generates an analog signal representing the amount of radiation exposure.

Still another object of the invention is to provide a radiation dosimeter system having daisy chained radiation dosimeter devices for providing radiation exposure monitoring about a platform, such as a craft.

A further object of the invention is to provide a radiation dosimeter system having daisy chained radiation dosimeter devices for providing radiation exposure monitoring about a craft using daisy chained analog signals indicating the amount of radiation exposure about the craft.

The present invention is directed to radiation dosimeter devices and a radiation dosimeter system for monitoring radiation exposures. The dosimeter devices provide direct measurements of the energy deposited in test masses of silicon in packages. The devices provide chained analog outputs that can be read by conventional satellite systems having analog input from sensors, such as temperature sensors. The devices are preferably placed about and throughout a spacecraft, such as inside subsystems boxes and upon exterior surfaces. The devices can provide continuous readouts of the total dose received throughout the host spacecraft, for which the devices and system could be used for generating a radiation exposure profile about the spacecraft.

The radiation dosimeter device can be made using monolithic electronics designs that produces a DC analog output voltage proportional to the total ionizing dose accumulated as a function of time at the location of the dosimeter in the host spacecraft. The dosimeter devices can operate from a single supply voltage in the range common to most spacecraft, and the output is compatible with standard spacecraft analog inputs. Additionally, an internal temperature monitor can be included in the dosimeter device providing a similar daisy chained optional analog port so that the device can be used for both radiation and temperature measurements.

The total dose is measured precisely by continually monitoring the energy deposited in a silicon test mass. In a preferred form, a single CMOS integrated circuit chip measures the radiation charge, and provides filtering, integration, and long-term retention of total accumulated dose. Several devices can be deployed, such as thirty-two devices, and can be daisy chained, utilizing conventional system interfaces. The dosimeter device is sufficiently small and requires limited spacecraft resources so that many of the devices can be deployed aboard a single spacecraft. Each dosimeter device measures the actual doses at respective points in or on the craft. For example, the devices can be placed inside payload subsystem boxes for enabling acquisition of an actual radiation depth-dose profile on a continuous basis throughout a mission. The dosimeter device provides an output proportional to the total dose at a specified location in the spacecraft, and can be readily displayed on a spacecraft health-and-safety monitoring screen without additional processing.

The dosimeter device can be a hybrid device that incorporates a silicon test detector on a single CMOS chip, a linear regulated power supply, and an environmentally sealed package. The silicon detector is used to give the radiation detection charge deposit in a known, test volume of silicon. The CMOS chip sweeps out this charge, amplifies the signal, provides threshold discrimination, integrates the charge deposits from all particles over time, and provides an analog output that is read out over a standard spacecraft analog interface. The dosimeter devices enclose detectors with the electronics that can be disposed in hermetically sealed packages filled with a purified dry nitrogen gas as an ideal environment for the detector, that is constant with time, and is shielded from external contaminants. The dosimeter devices use a daisy-chain protocol that autonomously circulates a readout token along the chain of devices, thus requiring only a single interface for the entire chain of devices. Such a chain of dosimeters is especially useful for large space structures, such as a space station.

The improved radiation dosimeter device provides a DC analog output voltage that is proportional to the total ionizing dose accumulated as a function of time at the location of the dosimeter in a host spacecraft. The units of the readout can be in ergs per gram, that is, the energy per unit mass, that is, by definition the radiation dose. The total dose is measured precisely by continually monitoring the energy deposited in a silicon test mass accumulating charge including charge contribution prior to radiation energy threshold detection for improved measurement of the total accumulated charge. These and other advantages will become more apparent from the following detailed description of the preferred embodiment.

DETAILED DESCRIPTION OF THE PREFERRED EMBODIMENT

Figure 1:
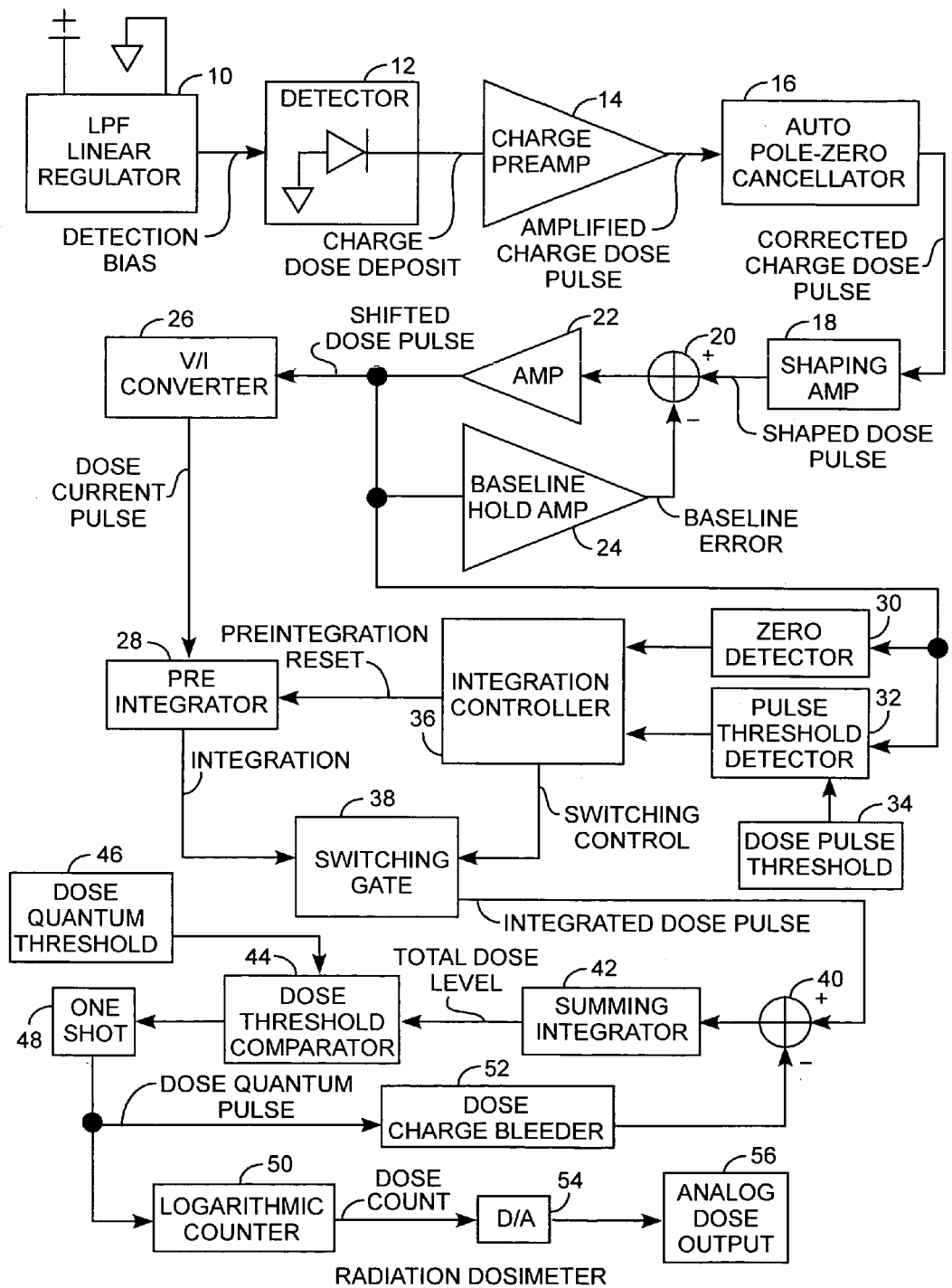
FIG. 1 is a block diagram of a radiation dosimeter device.

An embodiment of the invention is described with reference to the figures using reference designations as shown in the figures. Referring to FIG. 1, a radiation dosimeter, referred to herein as the dosimeter, including a low pass filter regulator 10 receiving system power. The regulator provides a detection bias for a detector 12 providing a charge dose deposit signal to a charge preamplifier 14 that in turn, provides an amplified charge dose pulse to an auto pole-zero cancellator 16. The charge dose pulse represents a pulse of received radiation by the detector 12. The cancellator 16 provides a corrected charge dose pulse to a shaping amplifier 18 for providing a shaped dose pulse to a pulse summer 20. Each shaped dose pulse represents a defined pulse for accumulation of shaped dose pulses for accumulating total charge. The summer provides a corrected pulse to a pulse amplifier 22 that in turn provides a shifted dose pulse to a baseline hold amplifier 24 and a voltage to current converter 26. The baseline hold amplifier 24 provides a baseline error signal that is subtracted from the shaped dose pulse to remove offset errors from subsequent integration.

The converter 26 provides a dose current pulse to a preintegrator 28 as the amplifier 22 provides the shifted dose pulse to a zero detector 30 and a pulse threshold detector 32. The pulse threshold detector compares the shifted dose pulse to a dose pulse threshold 34 for indicating that a charge threshold level has been reached while the zero detector indicates that a zero crossing of the shifted dose pulse has occurred. The preintegrator integrates the dose current pulse from the beginning of a zero crossing detection, and accumulates prethreshold charge prior to threshold detection and continues to integrate the dose current pulse at threshold detection and until the next zero crossing detection. The threshold detection for the detector 32 and zero crossing detection for detector 30 are inputs to an integration controller 36 that provides a preintegration reset signal to the preintegrator 28 that is reset upon a zero crossing detection. The integration controller 36 also provides a switching control to a switching gate 38 upon the detection of a threshold. The switching gate 38 routes the integration charge from the preintegrator 28 upon threshold detection and continues to route the integration charge as a postthresholding charge until the next zero crossing. The prethresholding charge integrated before threshold detection and postthresholding charge integrated as threshold detection is routed to the gate 38. The entire prethreshold and postthreshold integration from the gate 38 is routed as an integrated dose pulse for an entire radiation dose.

The integrated dose pulse including prethresholding and postthresholding charge accumulations is fed to an integration summer 40. During exposure of multiple radiation doses exceeding the pulse threshold 34, the gate 38 provides a respective series of integrated dose pulses to the summer 40 that in turns passes this series of integrated dose pulses to a summing integrator 42 that provides a total dose level. The total dose level is fed into a dose threshold comparator 44 receiving a predetermined dose quantum threshold. When the total dose level to the dose threshold comparator 44 exceeds the dose quantum threshold 46, the dose threshold comparator sends a trigger pulse to a one shot 48 that in turn provides a dose quantum pulse to a dose charge bleeder 52. The dose charge bleeder provides a predetermined dose charge bleed signal. The bleed signal is sent to the integration summer 40 for subtracting the dose quantum threshold amount of charge from the total dose level accumulation by the summing integrator 42 so as to bleed down the total dose level for each excitation of the one shot 48. The dose quantum pulse in also routed to a logarithmic counter 50 providing a dose count to a digital to analog converter 54 for providing an analog dose output signal that is a representative of the total radiation dose that has been absorbed by the detector 12.

The dosimeter can be made on a single chip containing all the electronics for the dosimeter. The primary mechanism by which an accurate total dose measurement is made is by integrating the absorbed energy of individual energetic particles in the silicon detector 12, while providing a standard analog output level to cover a wide dynamic range and connect directly to an analog interface. The detector 12 may be a high resistivity N-type ion-implanted junction silicon diode detector. A depletion region inside the detector 12 is void of all free charge carriers and serves as the active volume. When an energetic particle from the environment enters the volume, electron and hole pairs are created along the exposure path and the detection bias voltage creates an electric field that sweeps the charge out to the electrodes as the charge dose deposit. This charge is measured by the electronics and linearly correlates to the energy of the particle. The high resistivity, on the order of 60,000 ohm-cm, allows the detector 12 to be biased to full depletion from voltages as low as 5 volts. The detector 12 may be made 250 um thick to absorb energy from energetic particles in the range of 50 keV to 10 MeV, the particle range that contributes the most to the total dose in silicon electronics. A guard ring around the detector junction may be implemented to reduce the surface leakage current, enabling lower noise in order to achieve the 50 keV threshold.

Figure 2:
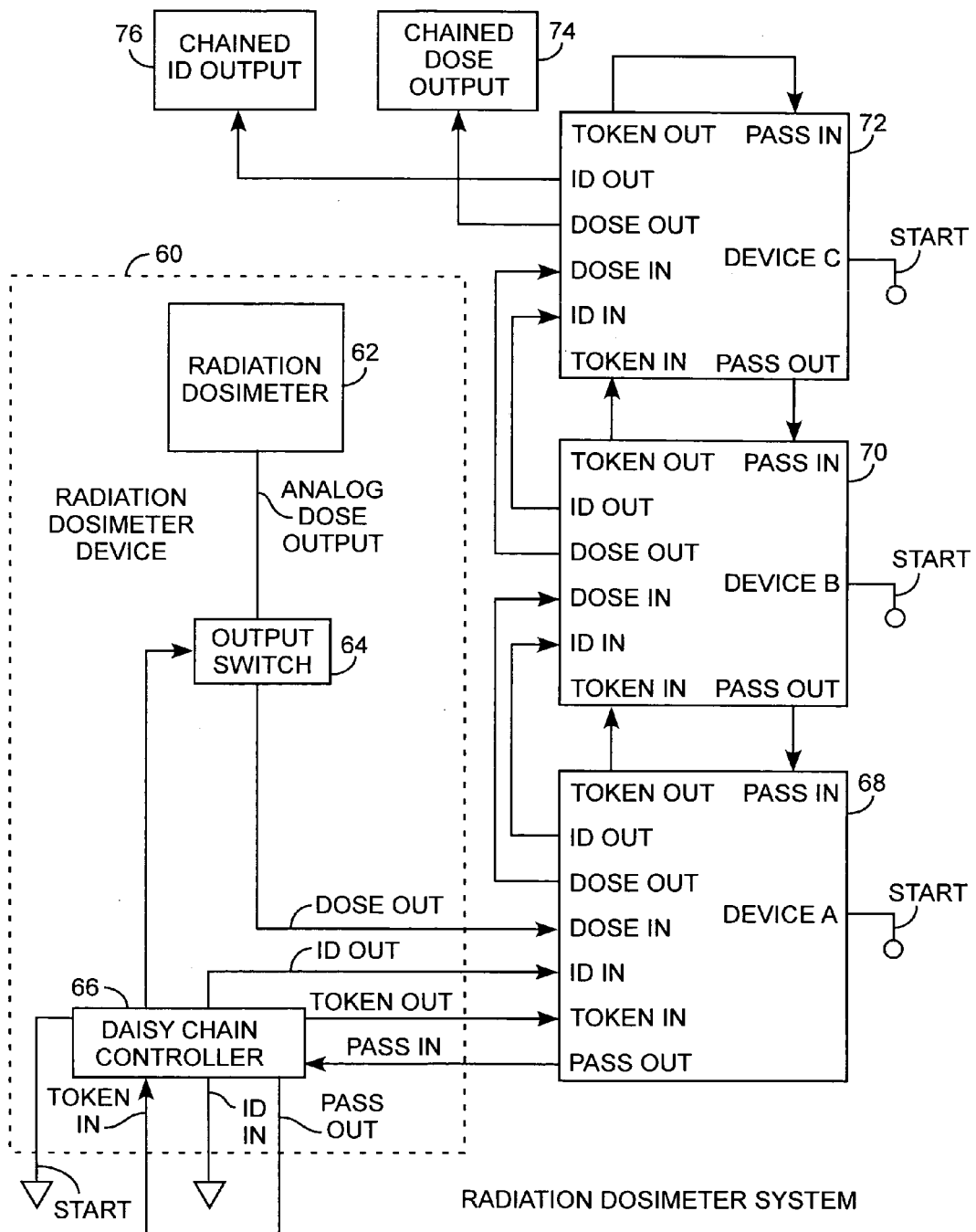
FIG. 2 is a block diagram of a radiation dosimeter system.

Referring to FIGS. 1 and 2, the dosimeter is made part of a radiation dosimeter device 60 including the radiation dosimeter 62. The device 60 includes an output switch 64 for communicating the analog dose output 56 to a dose out interconnection. The device 60 also includes a daisy chain controller 66 for daisy chain communications. Several devices, such as devices 60, 68, 70, and 72 can be daisy-chained. For example, up to thirty-two devices, preferably use start, token in, token out, identification in, identification out, pass in, pass out, dose out, and dose in signals for generating at the end of the chain of devices a chained dose output 74 and a chained ID output 76. The chained outputs 74 and 76 provide the radiation dose and ID of a respective device so that the dose for each device can be measured at several locations on the spacecraft without additional interface requirements. The devices may incorporate an internal temperature sensor, not shown, that is also daisy-chained in the same manner.

The analog dose output signal is presented through the output switch 64 that is controlled by the daisy chain controller 66. When the switch 64 is closed, the converter 54 drives the dose output. This can be at the same time when the internal temperature transducer provides a temperature analog output, not shown. A token passing method is used to circulate the readout of multiple devices in the daisy chain. The token protocol functions to circulate the device ID output 76 and the chained dose output 74. A number of devices are connected in series along a desired routing path of the daisy chain. It should be apparent that several daisy chains could be used in parallel with each chain having several devices. For each chain, a single start device, such as device 60, is selected as a start device by installing an external jumper on the package pins at the start input. Another jumper is installed to connect the start device token in signal to the token pass signal pins. The token out signal of each device is connected to the token in signal of the subsequent device in the chain. Preferably the token, pass, ID, and dose signals are routed in-line so that the devices are aligned as in a string when installed. The last device has a token out signal that is connected to the token pass. Each of the dosimeter devices has a daisy chain controller 66. The controller has a resister, not shown, in parallel to a short circuit switch, not shown. The switch is closed when the dosimeter device is in possession of the token and stays closed until the token is routed back through the pass in terminal. The resisters are all connected in series for generating the chained ID output 76 that has an analog value indicating which one of the dosimeter devices is in possession of the token, for relating the analog dose output 74 to one of the devices. A first device has a ground connected to the ID in terminal for grounding the series of resistors for providing a series connected resister ladder through the devices. As the token is passed, using the pass in and pass out terminals, from the last device 72 to the start device 60, the switches are opened, so as to reset the switches, and so as to start a next round of a round robin daisy chain presentation of the chain ID output 76 and the chained dose output 74. The token signal, indicating being active, begins at the start device and is delayed for a few seconds, which can be tunable on-circuit, before passing the token to the next device. When a device is active, the switch 64 is closed for providing the dose out producing a total dose output onto the dose out line when the output of the device ID out is also active. The device ID out signal indicates the address on the chained ID output 76 of the active device being readout with a dose out signal presented on the chained dose output 74. As a token signal is passed from token out to token in along the chain, each device presents an analog dose output and ID out to output 74 and 76. In this manner, a round-robin self-polling of all the devices in turn occurs, without system control.

Figure 3:
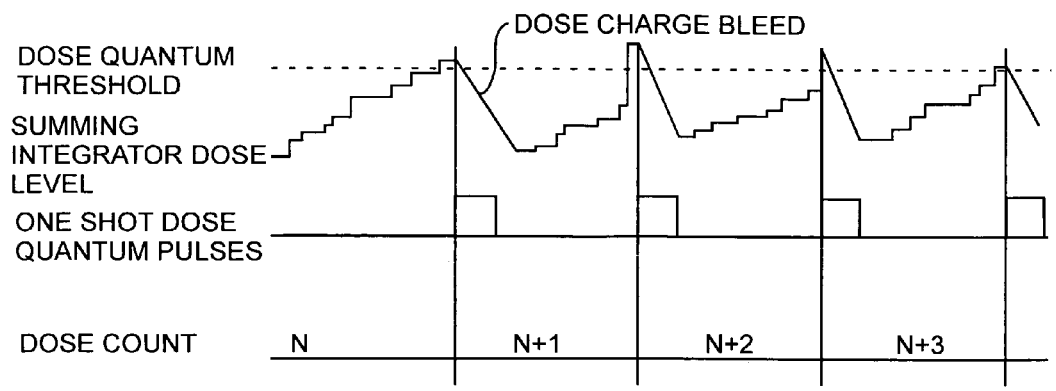
FIG. 3 is a timing diagram for quantizer loop integration.
Figure 4:
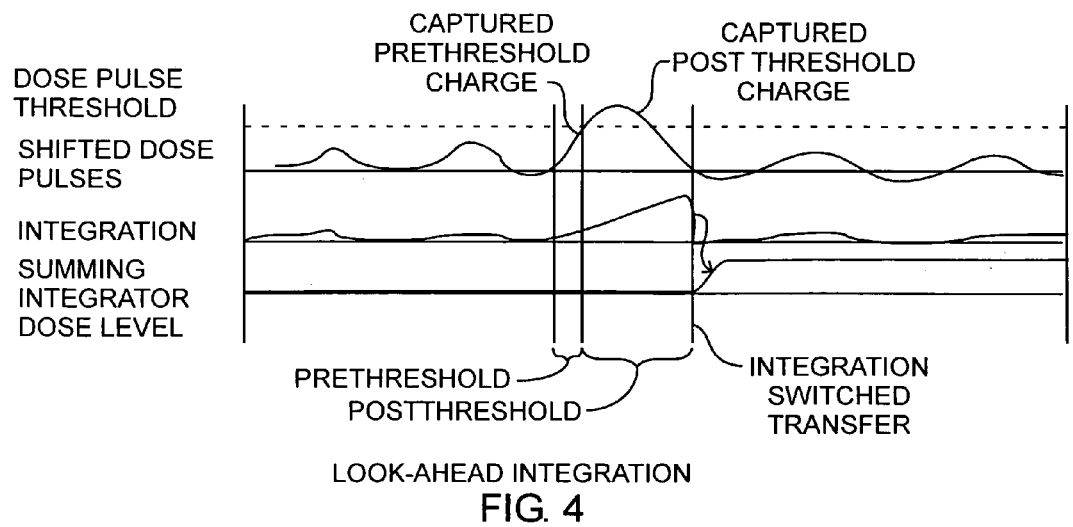
FIG. 4 is a timing diagram for look-ahead integration.

Referring to all of the figures, including FIGS. 3 and 4, the dosimeter device preferably operates from a single 5-volt supply rail supplied by a linear regulator of the spacecraft power system, not shown, having an input range between 12 to 40 volts. This enables the dosimeter to operate from standard spacecraft 28-volt bus power, or from a wide range of other positive voltages available in most electronic subsystems. The silicon detector 12 connects to a pulse processing chain including the low noise preamplifier 14, the auto pole-zero cancellator 16, and the shaping amplifier 18. The output of the shaping amplifier is a signal whose signal-to-noise ratio that is preferably optimized by capacitive matching in preamplifier 14, by a peaking time in shaping amplifier 18, and by minimization of leakage current in the detector 12. Each pulse signal produced by the detector 12 due to an energetic particle interaction gives rise to a unipolar, semigaussian shaped signal that is presented to voltage amplifier 22 that functions in conjunction with the baseline hold amplifier 24 as a feedback network to maintain a quiescent output voltage matched to the input bias point of the preintegrator 28. This processing chain ensures that DC mismatches between the signal processing chain and the preintegrator 28 are cancelled out before summing integration by the integrator 42. The amplified and baseline-shifted dose pulse signal from the amplifier 22 is an input for summing pulse integration using the preintegrator 28 and the summing integrator 42. This preintegration and summing integration reduces the error caused by late triggering of low energy particles near the energy threshold.

The preintegrator 28 integrates continuously, even before a pulse signal is detected by the detector 32. A decision is made by the zero detector 30 and the controller 36 as to whether the output of the preintegrator integrating prethreshold signal is a real signal above threshold 34. When the shifted dose pulse signal exceeds the threshold 34, the controller 36 logic waits for the next zero crossing and closes the switching gate 38 and which then transfers the preintegration charge to the summing integrator 42. The switching gate 38 is preferably a linear gate that effectively excludes the thermal component of the detector current for maintaining accuracy at low dose rates. If the integration output of the preintegrator is not a valid signal, the controller clears the preintegrator 28 upon the next zero crossing. When the input to the preintegrator 28 is above the zero crossing, the preintegrator 28 is in integration mode. When the input to the preintegrator 28 is below the zero crossing, the preintegrator 28 is in a reset mode. When preintegration is in integration mode and when the threshold detector 32 does not trigger before the next zero crossing, the controller 36 clears the preintegrator 28. When the threshold detector does trigger before a zero crossing, that indicates that a real signal has crossed the energy threshold and the controller 36 allows the preintegrator integration signal to continue integrating until the signal returns back to a zero crossing. Once this is accomplished, the preintegrator 28 contains the integration of the entire signal and it is then transferred to the summing integrator 42 through the gate 38. This process continues until the charge contained in the summing integrator 42 exceeds the dose quanta threshold 46 that is set by dose threshold comparator 44. When the dose threshold exceeds the dose quantum threshold; the one shot 48 is triggered, which produces fixed-width dose quantum pulses at N, N+1, N+2, N+3, for example, which activates the bleeder 52 for subtracting the charge in the summing integrator. The bleeder functions to remove a fixed quanta of charge from the summing integrator 42 while at the same time incrementing a pseudo-logarithmic counter 50 to register a new dose value in the analog output 56. The logarithmic counter 50 can be made immune to bit-errors, due to single-event-upset for example, by the use of triple redundancy logic and an auto-refresh feature, not shown. The pseudo-logarithmic counter 50 with the analog output 56 can provide +/−1.6% measurement accuracy for total dose ranges up to 1.3 MRads assuming 12-bit idealized performance in the host spacecraft.

Alternatively, output of the signal from the amplifier 22 can be fed directly into the summing integrator through the gate 38, which is gated by threshold detector 32. In this alternative case, instead of using the baseline hold amplifier 24 to exactly cancel the offsets from amplifier 22 and summing integrator 42, an offset can be introduced to correct the result for signals near threshold. A fixed DC offset equal to half of a signal at the threshold 34 is added to all signals. Both alternative circuits can be built on a CMOS 0.5 um process.

The dosimeter is preferably a physical package having a cavity, not shown. The cavity contains the detector and substrate, which holds the chip, the linear regulators, and other necessary passive support components. The cavity is filled with purified nitrogen gas and sealed with a welded lid in order to provide a clean and dry environment for the detector. The device can be mounted in two preferred ways. The device can be attached with screws or with glue to the surface of a spacecraft panel or payload box and operate like a temperature sensor, only providing radiation dose as its output. The device can be soldered on a printed circuit board directly and measure the dose at the location of the most critical components.

The dosimeter can be made small in size. The daisy-chain polling allows for multiple devices to be placed on a single vehicle. The dosimeter can be many times smaller in volume and many times lighter. The ease of manufacturability of the electronic chip, detector, and substrate as well as the limited recurring engineering costs greatly reduce the cost of reproduction, and all devices can be manufactured identically. The device offers preintegration performance improvement, mounting flexibility, and conventional electrical interface. The improved radiation dosimeter device in an improved radiation dosimeter system provides a DC analog output voltage that is proportional to the total ionizing dose accumulated as a function of time at the location of the dosimeter in a host spacecraft. The device can operate in a system bus voltage range common to spacecraft dosimeter system with the output being compatible with conventional spacecraft analog inputs. The total dose is measured precisely by continually monitoring the energy deposited in a silicon test mass by accumulating charge including charge contribution prior to radiation threshold detection for improved measuring of the total accumulated charge. The dosimeters are daisy-chained and distributed about the spacecraft for providing a spacecraft dose profile about the spacecraft using the improved radiation dosimeter system. Those skilled in the art can make enhancements, improvements, and modifications to the invention, and these enhancements, improvements, and modifications may nonetheless fall within the spirit and scope of the following claims.

What is claimed is:

1. A dosimeter for measuring radiation and for providing a dose output, the dosimeter device comprising,
   a detector for detecting the radiation and for providing a detected charge dose pulse, the detector generating a sequence of detected charge dose pulses for the radiation,
   an integrator for integrating the detected charge dose pulses by preintegrating each of the detected charge dose pulses prior to the detected charge dose pulse reaching a dose pulse threshold and by postintegrating each of the detected charge dose pulses after the detected dose pulse reaches the dose pulse threshold, the preintegrating and postintegrating for providing an integrated dose pulse for each of the detected charge dose pulses reaching the dose pulse threshold, the integrated dose pulse being generated each time one of the detected charge dose pulses reaches the dose pulse threshold, the integrator providing a sequence of integrated dose pulses corresponding to a respective sequence of detected charge dose pulses reaching the dose pulse threshold, and
   a summer for summing the sequence of integrated dose pulses into a total dose level, the summer for comparing the total dose level to a total quantum threshold, the summer for subtracting the total quantum threshold from the total dose level each time the total dose level exceeds the total quantum threshold, the summer summing the sequence of the integrated pulses by counting each time the total quantum threshold is exceeded by the total dose level for providing the dose output.

2. The dosimeter of claim 1 wherein the dosimeter is a dosimeter device further comprising,
   an interface for presenting the dose output onto a communication line.

3. The dosimeter of claim 1 wherein the dosimeter is a dosimeter device, the dosimeter device further comprising,
   an interface for presenting the dose output onto a communication line, the dose output being an analog signal indicating the amount of radiation exposure captured by the counting of a number of times the total quantum threshold is exceeded by the total dose level.

4. The dosimeter of claim 1 wherein the integrator comprises,
   a preintegrator for preintegrating each one of the detected charge dose pulses before the detected dose pulse reaches the dose pulse threshold.

5. The dosimeter of claim 1 wherein the integrator comprises,
   a preintegrator for preintegrating each charge dose pulse of the detected charge dose pulses before the detected dose pulse reaches the dose pulse threshold, the preintegrator being reset whenever the detected dose pulse crosses a predetermined reference level.

6. The dosimeter of claim 1 wherein the integrator comprises,
   a preintegrator for preintegrating and postintegrating each charge dose pulse one of the detected charge dose pulses that reaches the dose pulse threshold respectively before the detected dose pulse reaches the dose pulse threshold and after the detected charge dose pulse reaches the dose pulse threshold.

7. The dosimeter of claim 1 wherein the integrator comprises,
   a preintegrator for preintegrating and postintegrating each charge dose pulse of the detected charge dose pulses that reaches the dose pulse threshold respectively before the detected dose pulse reaches the dose pulse threshold and after the detected charge dose pulse reaches the dose pulse threshold, the preintegrator being reset whenever the detected dose pulse crosses a zero level.

8. The dosimeter of claim 1 wherein, the integrator comprises,
   a preintegrator for preintegrating and postintegrating each charge dose pulse of the detected charge dose pulses respectively before the detected charge dose pulse reaches the dose pulse threshold and after the detected charge dose pulse reaches the dose pulse threshold, the preintegrator being cleared when the detected charge dose pulse crosses a zero level,
   a zero crossing detector for resetting the preintegrator, and
   a threshold detector for detecting when the detected charge dose pulse reaches the dose pulse threshold, the threshold detector for communicating the preintegration and postintegration of the detected charge dose pulses as the integrated dose pulses.

9. The dosimeter of claim 1 wherein, the integrator comprises,
   a preintegrator for preintegrating and postintegrating each charge dose pulse of the detected charge dose pulses respectively before the detected charge dose pulse reaches the dose pulse threshold and after the detected charge dose pulse reaches the dose pulse threshold, the preintegrator being cleared when the detected charge dose pulse crosses a zero level,
   a zero crossing detector for resetting the preintegrator,
   a threshold detector for detecting when the detected charge dose pulse reaches the dose pulse threshold, and
   a switching gate for communicating the preintegration and postintegration of the detected charge dose pulses as the integrated dose pulses.

10. The dosimeter of claim 1 wherein the summer comprises,
    a summing integrator for summing the integrated dose pulses into a total dose level,
    a comparator for detecting when the total dose level exceeds a quantum threshold, the comparator for bleeding a quantum amount of dose from the total dose level each time the comparator detects when the total dose level exceeds the quantum threshold, and
    a counter for storing a counter value, the counter being incremented each time the total dose level exceeds the quantum threshold, the counter value for indicating the amount of radiation exposure.

11. The dosimeter of claim 1 wherein the summer comprises,
- a summing integrator for summing the integrated dose pulses into a total dose level,
- a comparator for detecting when the total dose level exceeds a quantum threshold, the comparator for bleeding a quantum amount of dose from the total dose level each time the comparator detects when the total dose level exceeds the quantum threshold,
- a counter for storing a counter value, the counter being incremented each time the total dose level exceeds the quantum threshold, the counter value for indicating the amount of radiation exposure, and
- a converter for converting the counter value into an analog output indicating the radiation exposure.

* * * * *